United States Patent [19]
Mochizuki et al.

[11] Patent Number: 5,467,694
[45] Date of Patent: Nov. 21, 1995

[54] APPARATUS FOR CONTROLLING WATER CONTENT OF FRIED FOOD USING MICROWAVE HEATING

[75] Inventors: Keizo Mochizuki; Tomio Minobe, both of Saitama, Japan

[73] Assignees: Meiji Seika Kaisha, Ltd., Tokyo; Micro Denshi Co., Ltd., Saitama, both of Japan

[21] Appl. No.: 419,692

[22] Filed: Apr. 11, 1995

[30] Foreign Application Priority Data

Apr. 11, 1994 [JP] Japan .................. 6-095486

[51] Int. Cl.⁶ .............. A23L 1/00; A23L 1/025; H05B 6/64; H05B 6/78
[52] U.S. Cl. ............... 99/355; 34/259; 34/265; 99/443 C; 99/451; 99/477; 99/DIG. 14; 219/388; 219/680; 219/700; 219/701
[58] Field of Search ............ 99/386, 443 C, 99/451, 477–479, 355, 352, DIG. 14, 404, 407; 426/241–243; 34/217, 225, 229, 259, 265, 423, 508; 219/400, 680, 685, 693, 700, 701, 712, 752, 684, 388

[56] References Cited

U.S. PATENT DOCUMENTS

| | | | |
|---|---|---|---|
| 3,884,213 | 5/1975 | Smith | 99/DIG. 14 |
| 4,073,952 | 2/1978 | Standing et al. | 34/259 |
| 4,103,431 | 8/1978 | Levinson | 34/259 |
| 4,154,861 | 5/1979 | Smith | 99/443 C |
| 4,289,792 | 9/1981 | Smith | 219/700 |
| 4,338,911 | 7/1982 | Smith | 99/477 |
| 4,409,453 | 10/1983 | Smith | 99/451 |
| 5,049,711 | 9/1991 | August | 219/701 |
| 5,107,087 | 4/1992 | Yamada et al. | 99/DIG. 14 |
| 5,285,719 | 2/1994 | McFadden et al. | 99/476 |
| 5,298,707 | 3/1994 | Sprecher et al. | 219/700 |
| 5,392,698 | 2/1995 | Sprecher et al. | 99/443 C |

*Primary Examiner*—Timothy F. Simone
*Attorney, Agent, or Firm*—Sughrue, Mion, Zinn, Macpeak & Seas

[57] ABSTRACT

An apparatus for drying a fried food has a dry chamber being provided with separated chambers in which the food is transported in order, a microwave oscillator for supplying a microwave energy to the respective separated chambers, and hot blast generator for supplying heated air to the respective separated chambers. The length in the food forward direction of each of the separated chamber is equal to or longer than that of just before chamber. The microwave energy supplied to each of the separated chamber corresponds to the water content of the fried food passing through the chamber.

4 Claims, 2 Drawing Sheets

APPARATUS FOR CONTROLLING WATER CONTENT OF FRIED FOOD USING MICROWAVE HEATING

BACKGROUND OF THE INVENTION

1. Field of the Invention

The present invention relates to an apparatus for controlling water content of fried food such as a snack food, tempura, rice cracker by using microwave energy in combination of heated air.

2. Description of the Conventional Art

In such as a snack food and precooked food, water contained in the raw materials thereof such as fresh vegetables, noodles, shellfishes, tempura is evaporated and dried so as to preserve for a long time.

In general, the temperature of the oil in a fryer is controlled in the range of about 160° C. to 190° C. The food is continuously transported through the fryer to be the fried food so that the final water content of the fried food is controlled to fall in the range of 0.5% to 5% to keep the product in a dry state.

However, some raw materials of the fried food are easy to be heated and the other raw materials of the fried food are difficult to be heated. The raw materials easy to be heated can be finished to achieve the above final water content by merely frying in oil. However, it may take a long time to finish the raw materials difficult to be heated. Consequently, the food contents a lot of oil, thereby having a bad quality.

If the food is fried at higher temperature in order to shorten the time for finishing, the surface of the food changes its color and quality.

In addition, since raw materials such as fresh vegetables, shellfishes, potatoes rich in saccharide are easy to be browned, the frying time have to be as short as possible.

Accordingly, the raw materials difficult to be heated and the raw materials easy to be browned are fried so that the water content thereof is in the range where the marketability thereof is not spoiled. Thereafter, the food is dried by a heating dryer using heated air or extreme infrared radiation so as to control the water content, thereby producing a dry fried food.

In the above conventional dryer, since the fried food is heated from its outside, it takes a lot of time to heat up the core portion thereof. Accordingly, it is difficult to dry the food without spoiling the marketability thereof.

Accordingly, it has been considered that heated air is supplied to the fried food simultaneously with applying the microwave energy which affects the food to heated up from the core portion thereof.

Therefore, heated air heats the fried food from the outside and the microwave heats it from the inside so that the fried food is heated and dried uniformly.

However, the exoergic principle of the microwave energy is a frictional heat due to molecular vibration caused by the microwave applied to water contained in the fried food. Consequently, with decreasing water content, its microwave absorption gets worse, thereby being difficult to be heated. That is, it takes a long time and consume much microwave so as to cause the fried food to be in a dry state (low water containing state), thereby causing unefficiecy. In addition, the power of unavailable microwave which is not absorbed by the fried food may be a reflected power returning to the microwave oscillator, thereby causing breaking the oscillator.

On the other hand, during the heating and drying, large amount of water and oil are evaporated from the fried food. The evaporated water with oil has to be discharged to the outside, because its standing in a dry chamber deteriorates the working environment and sanitation. In addition, malodorous gas must not to be discharged to the open air in view of environment pollution.

SUMMARY OF THE INVENTION

It is an object of the present invention to provide an apparatus for drying a fried food which is capable of efficiently drying the fried food by using a microwave energy in combination of heated air, and appropriately deodorizing malodorous gas being generated during the drying.

An apparatus according to the present invention for drying a fried food and appropriately lowering water content of the food, includes a dry chamber being provided with a plurality of separated chambers through which the food passes in order, at least one of the separated chamber having a length in a food forward direction longer than that of the other separated chambers; and heating means for supplying microwave energy and heated air to the respective separated chambers, the microwave energy to be supplied to respective separated chambers corresponding to the water content of the food passing through the respective separated chambers.

In the above apparatus of the present invention, the microwave energy and the heated air are applied to the food while the food passes through the respective separated chambers. Accordingly, the food can be heated from the outside by the heated air and from the inside by the microwave energy. In addition, even if the food which has been dried and arrived at a separated chamber where the microwave absorption of the food gets worse, since the length of the separated chamber is longer than that of the other chambers, the water content of the food passing through the chamber is apparently increased. Accordingly, the food can be applied the microwave energy corresponding to the water content of the food in the chamber.

BRIEF DESCRIPTION OF THE DRAWINGS

In the accompanying drawings.

DETAILED DESCRIPTION OF THE INVENTION

The detailed description of the present invention will be described as follows referring to the accompanying drawings.

Figure 1:
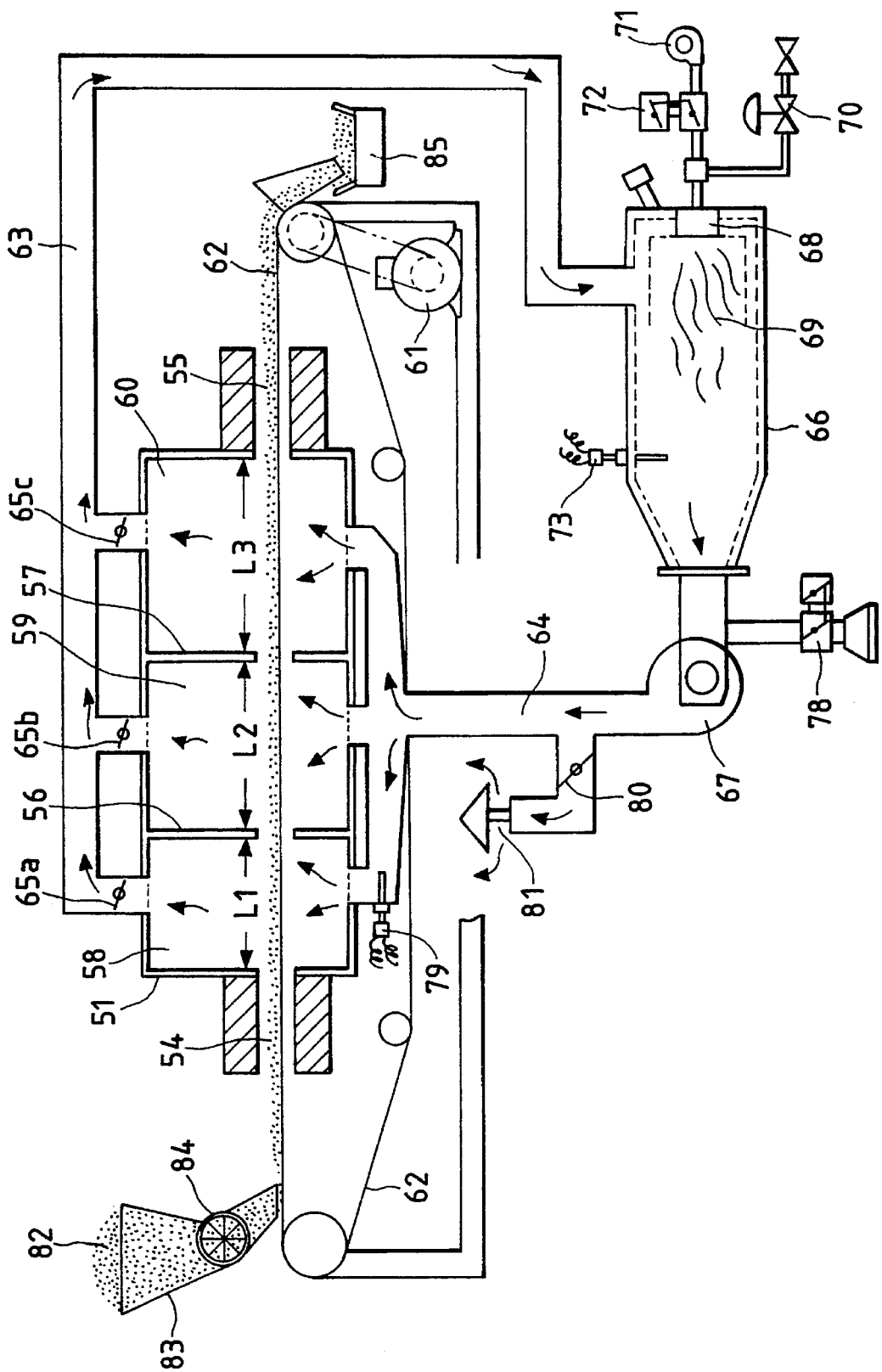
FIG. 1 is a schematic plan view showing a drying apparatus according to the present invention.
Figure 2:
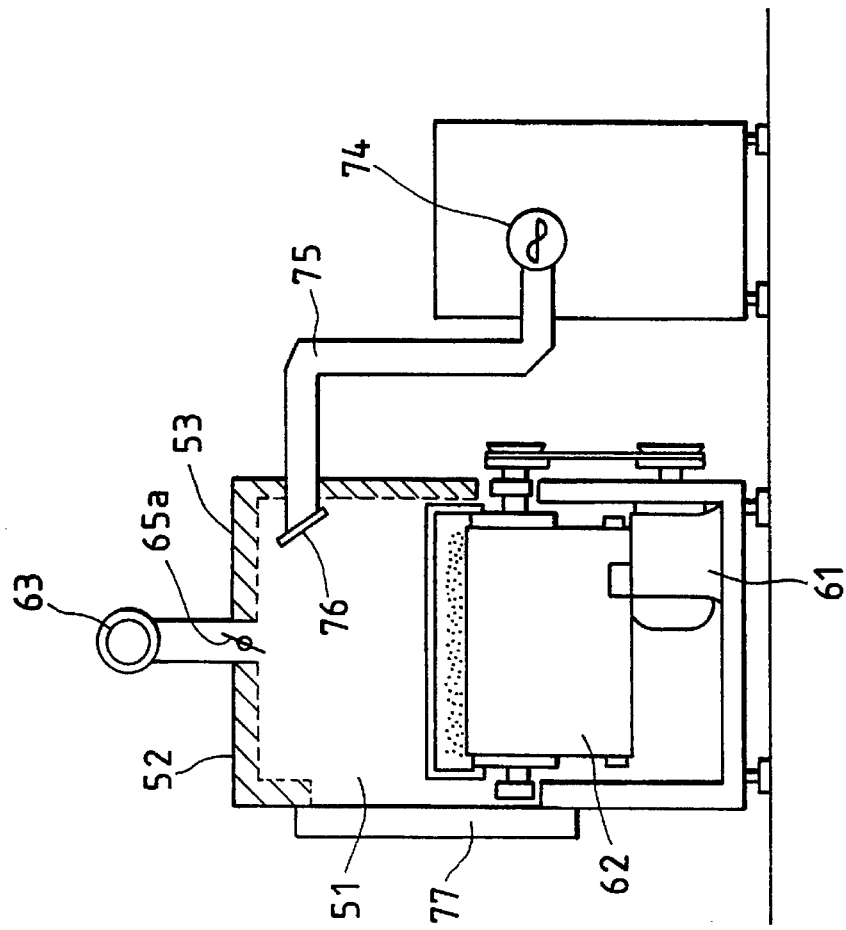
FIG. 2 a schematic side view showing the drying apparatus according to the present invention.

FIG. 1 is a schematic plan view showing a drying apparatus according to the present invention, and FIG. 2 is a schematic side view showing the drying apparatus according to the present invention.

In these drawings, a dry chamber 51 is constituted by an outer plate 52 and a heat insulation material 53, and is provided with openings 54, 55 to which a countermeasures to microwave leakage is subjected.

The dry chamber 51 is separated to three separated chambers 58, 59, 60 by separation plate 56, 57. The separation plates 56, 57 is provided with openings respectively as similar to the openings 54, 55 so that the respective chamber 58, 59, 60 are communicated each other.

The three separate chambers 58, 59, 60 having lengths of L1, L2 L3, respectively which satisfy conditions of L1+L2+L3=L and L1≦L2<L3, where L is a length of the dry chamber 51. Namely, the length of each of the separated chambers is equal to or longer than that of just before chamber in the food forward direction. Thus formed dry chamber 51 has a transport belt 62 which is driven by a motor 61.

An exhaust duct 63 is provided above and a blast duct 64 is provided under respective separate chambers 58, 59, 60, so that they are communicated with the separate chambers 58, 59, 60, respectively. Adjusting dampers 65a, 65b, 65c are provided in the vicinity of communication holes of respective separated chamber 58, 59, 60, respectively. The exhaust duct 63 and the blast duct 64 has the heat insulation structure as similar to the dry chamber 51.

The exhaust duct 63 is communicated with a combustion type hot blast generator 66. The blast duct 64 is also communicated with the generator 66 through a circulation blower 67. That is, the separated chamber 58, 59, 60, the exhaust duct 63, the hot blast generator 66, and the blast duct 64 forms a circulation path of heated air.

The hot blast generator 66 uses fuel such as crude petroleum, kerosene or LP Gas which is lighted up by a combustion burner 68 to burn with appearing flames 69. The fuel is supplied via a piping system such as a control valve 70, and air necessary for the combustion is supplied from an air introduce blower 71 via a control valve 72.

The combustion temperature in the hot blast generator 66 is detected by a temperature sensor 73 so that a setting temperature thereof is adjusted to be in the range of 500° C. to 1600° C. by the detected signal. The inner wall of the hot blast generator 66 is formed by a fire resistant material such as fire resistant bricks.

A microwave oscillator 74 is connected with the separated chambers 58, 59, 60, and supplies microwave energy to them respectively, via waveguides 75. Respective microwave energies supplied to respective separated chambers correspond to the water content of food transported in respective separated chambers.

The microwave oscillator 74 supplies microwave energies Q1, Q2, Q3 (kW) to the separated chamber 58, 59, 60, respectively, under the condition of Q1+Q2+Q3≦Q where Q is the total power amount of the oscillator. Namely, Q1, Q2, Q3 correspond to the water content of food transported in separated chambers 58, 59, 60, respectively. An irradiation holes of the microwave energy is provided with a seal member 76 made of teflon, ceramic, quartz glass or the like so as to prevent the invasion of the heated air. The respective separated chamber 58, 59, 60 are provided with inspection doors 77 at the side portion thereof, respectively.

In addition, a control valve 78 for introducing fresh air adjusts the temperature of the heated air heated in the hot blast generator 66 so as to lower its temperature to 80° C. to 160° C. This adjustment is conducted based on the detected signal of the temperature sensor 79. An adjustment damper 80 is provided in a branch path of the blast duct 64, the top end of the branch path being provided with an exhaust opening 81.

Next, the operation of the drying apparatus will be described as follows.

Food fried by a fryer is continuously supplied from a supply feeder 84 of a supply hopper 83 to the transport belt 62. The food on the transport belt 62 passes the respective separated chamber 58, 59, 60 and is delivered to an ejection conveyer 85. The fried food is simultaneously given the microwave energy and the heated air in the separated chamber 58, 59, 60, respectively, while it passes the respective chambers.

The heated air heated by the hot blast generator 66 at the temperature of 500° C. to 1600° C. is cooled by the operation of the control valve 78 for introducing fresh air operated based on the detected signal of the temperature sensor 79 to 80° C. to 160° C. The cooled air is sent to the respective separated chambers 58, 59, 60.

In the separated chambers 58, 59, 60, water and oil contented in the food 82 are evaporated to generate vapor. The generated gas is malodorous gas which is introduced to the exhaust duct 63 via respective adjustment damper 65a, 65b, 65c, and taken by the circulation blower 67 to return to the hot blast generator 66. Finally, the malodorous gas directly contacts with the flames 69 burning at 500° C. to 1600° C. to be burned immediately.

The burning time of the malodorous gas is preferably in the range of 0.3 to 1.0 sec. so as to completely decompose the oil and simultaneously conduct deodorization process. Thus decomposed and deodorized hot air is heated by the control valve 78 to be the heated air necessary for the drying which is resent to the separated chambers 58, 59, 60 via the blast duct 64. On the other hand, unnecessary heated air is exhausted to the open air from the exhaust opening 81 via the adjustment damper 80.

On the other hand, the fried food 82 is applied the microwave energy of Q1, Q2, Q3 (kW) in the separated chamber 58, 59, 60 having the length of L1, L2, L3, respectively.

Accordingly, the fried food 82 go forward with being dried. In the latter half of the dry chamber where the water content of the food have been decreased, the fried food 82 is introduced into the separated chamber 60 having a longer length so that the food is heated and dried by applying the microwave energy Q3 corresponding to the water content of the food apparently increased.

As a result, even if the water content of the food is lowered, the apparatus can sufficiently dry the food to be desired dry state (water content: 0.5% to 5%). Further, if the water content of the fried food is previously measured so as to determine the length of the separated chambers 58, 59, 60 and the microwave energy Q1, Q2, Q3 supplied to the separated chambers 58, respectively, based on the measured water content, it is possible to dry the fried food by microwave energy less than the total microwave energy Q.

Figure 3:
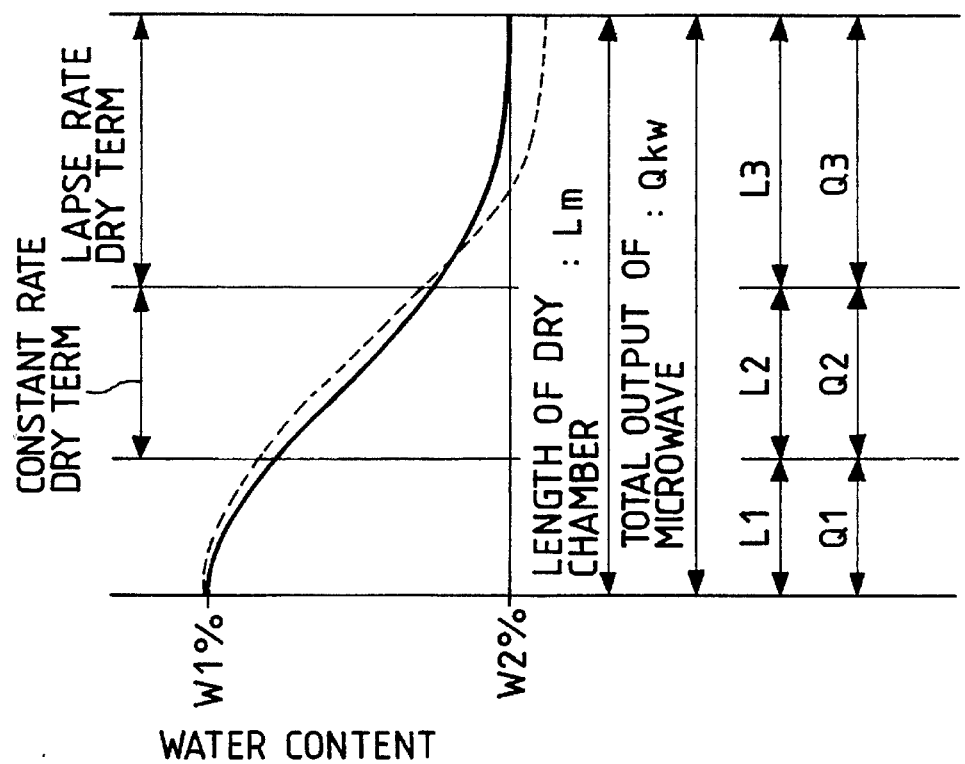
FIG. 3 is a diagram of water lapse rate curves showing changes of water content of fried food in drying process.

A dotted line of FIG. 3 shows a water lapse rate curve of the fried food 82 heated and dried by the apparatus of the above embodiment. First, the food consumes the energy to raise its temperature and decrease moderately its water content. Next, the water content of the food linearly decreases in a constant rate dry term. Further, even if the food is in a lapse rate dry term, the water content of the food decreases in substantially linear to achieve the desired water content.

On the other hand, a solid line of FIG. 3 shows a water lapse rate curve of the fried food which is heated and dried in an apparatus in which the food is heated and dried by applying the microwave energy Q (kW) in the dry chamber 51 having the length of L1 without separating the dry chamber 51. In this case, the water content linearly decreases in the constant rate dry term as similar to the dotted line case, however, its decreasing gets worse in the lapse rate dry term, thereby taking a lot of time to achieve the desired water content.

The experimental data of the fried food heated and dried by the drying apparatus according to the above embodiment is shown in the following tables.

TABLE I

| Condition of the experiment | |
|---|---|
| Fried Food | stick-like or thickly cut formed potato |
| Water Content of Fried Food | 18% |
| Desired Water Content | less than 2% |
| Processing Amount | 53 Kg/hour |
| Transport Belt Width | 500 mm teflon glass net belt |
| Heated Air | blown at 130° C. (partly circulated and partly exhausted) |
| Water Content Measuring Apparatus | infrared moisture meter FD-220, made by Ket Science laboratory |

TABLE II

| | Not Separated Dry Chamber | Separated Dry Chamber | |
|---|---|---|---|
| Specification of Dry Chamber | Length of Chamber: L = 3000 mm | Length of Separated Chamber: L1 = 750 mm L2 = 750 mm L3 = 1500 mm L = 3000 mm | |
| Microwave Output and its Irradiation Method | 15 kW microwave is irradiated to whole dry chamber of 3000 mm | L1 Chamber: L2 Chamber: L3 Chamber: Total output: | 5.5 kW 5.5 kW 4.0 kW 15 kW |
| Final Water Content | 2.8% | 1.8% | |

As described above, the drying apparatus according to the present invention is provided with separated chambers having different lengths. While the fried food passes in these chambers, the microwave energy corresponding to the water content thereof is applied to the fried food in combination with the heated air so as to dry the fried food, thereby enhancing the exoergic efficiency due to the microwave absorption of the food. Accordingly, the apparatus can obtain the shortened drying time and high using efficiency of the microwave energy.

In addition, the vapor including water and oil generated during the heating and drying is subjected to contact with the burning flames of hot blast generator generating the heated air to conduct deodorizing process. A part of the heated air is used as the heated air for drying and the other is exhausted to the open air. Therefore, the drying apparatus of the present invention obtains good working environment and sanitation and has an advantage in view of environment pollution.

What is claimed is:

1. An apparatus for drying a fried food and appropriately lowering water content of said food, comprising:

a dry chamber being provided with a plurality of separated chambers through which said food passes in order, at least one of said separated chamber having a length in a food forward direction longer than that of the other separated chambers; and heating means for supplying microwave energy and heated air to said respective separated chambers, said microwave energy to be supplied to respective separated chambers corresponding to the water content of said food passing through said respective separated chambers.

2. An apparatus as claimed in claim 1, wherein said heating means comprises:

microwave oscillating means for supplying the microwave energy to said respective separated chamber; and hot blast generating means for burning fuel to generate heated air and supplying said heated air to said respective separated chambers.

3. An apparatus as claimed in claim 2, further comprising:

means for admitting vapor including water and oil generated from said food in said dry chamber into said hot blast generating means and subjecting said vapor to deodorize by directly contacting said vapor with flames of said blast generating means; and means for adjusting an temperature of heated air generated with deodorizing, supplying a part of said adjusted heated air to said respective separated chamber, and exhausting the other part of said adjusted heated air to the open air.

4. An apparatus as claimed in claim 1, wherein the length of each of said separated chambers is at least one of equal to and longer than that of just before chamber in the food forward direction.

* * * * *